(12) United States Patent
Waeller et al.

(10) Patent No.: US 8,411,040 B2
(45) Date of Patent: Apr. 2, 2013

(54) OPERATING DEVICE OF A MOTOR VEHICLE AND METHOD FOR RECORDING USER INPUTS

(75) Inventors: Christoph Waeller, Braunschweig (DE); Katharina Bachfischer, Wolfsburg (DE); Lennart Bendewald, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 1452 days.

(21) Appl. No.: 11/956,831

(22) Filed: Dec. 14, 2007

(65) Prior Publication Data

US 2008/0158190 A1 Jul. 3, 2008

(30) Foreign Application Priority Data

Dec. 14, 2006 (DE) .................. 10 2006 059 032

(51) Int. Cl.
*G09G 5/00* (2006.01)
(52) U.S. Cl. ..................................... 345/173; 178/18.01
(58) Field of Classification Search .................. 345/156, 345/158, 173; 340/461, 991; 178/18.01; 463/30; 382/124
See application file for complete search history.

(56) References Cited

U.S. PATENT DOCUMENTS

| | | | |
|---|---|---|---|
| 5,844,500 A | 12/1998 | Beuk et al. | |
| 5,923,267 A | 7/1999 | Beuk et al. | |
| 6,009,355 A | 12/1999 | Obradovich et al. | |
| 6,330,497 B1 | 12/2001 | Obradovich et al. | |
| 6,703,944 B1 | 3/2004 | Obradovich | |
| 7,084,859 B1* | 8/2006 | Pryor | 345/173 |
| 7,453,444 B2* | 11/2008 | Geaghan | 345/173 |
| 7,474,772 B2* | 1/2009 | Russo et al. | 382/124 |
| 7,952,567 B2* | 5/2011 | Aroyan et al. | 345/174 |
| 2006/0261672 A1 | 11/2006 | Richter | |
| 2007/0168089 A1 | 7/2007 | Goldbeck et al. | |
| 2007/0242050 A1 | 10/2007 | Kuenzner et al. | |

FOREIGN PATENT DOCUMENTS

| | | |
|---|---|---|
| DE | 41 21 180 | 1/1993 |
| DE | 195 29 571 | 2/1997 |
| DE | 100 15 726 | 10/2001 |
| DE | 100 31 982 | 1/2002 |
| DE | 102 20 797 | 12/2003 |

(Continued)

OTHER PUBLICATIONS

Search Report, European Patent Application No. 07 022 845.7, dated Feb. 5, 2008 (translated).

(Continued)

*Primary Examiner* — Abbas Abdulselam
(74) *Attorney, Agent, or Firm* — Kenyon & Kenyon LLP

(57) ABSTRACT

In an operating device of a motor vehicle and a method for recording user inputs in a motor vehicle, the operating device includes a control unit and at least one operating element coupled to the control unit, via whose operation a user input is able to be recorded, an approach sensor system being coupled to the control unit, using which an approach of an actuating element, e.g., of a body part, for example, of a finger of a user to the at least one operating element is able to be recorded before the operation of the at least one operating element occurs. The control unit is adapted to, in response to a recorded approach of the actuating element to the at least one operating element, output information in connection with an operation of the operating element before an operation of the operating element occurs.

20 Claims, 4 Drawing Sheets

FOREIGN PATENT DOCUMENTS

| | | |
|---|---|---|
| DE | 103 126 215 | 12/2004 |
| DE | 103 42 666 | 4/2005 |
| DE | 10 2004 053 950 | 3/2006 |
| DE | 10 2004 058 954 | 6/2006 |
| DE | 10 2005 012 309 | 11/2006 |
| EP | 0 675 018 | 10/1995 |
| EP | 1 228 917 | 8/2002 |
| EP | 1 246 364 | 10/2002 |
| WO | WO 99/06987 | 2/1999 |
| WO | WO 2004/078536 | 9/2004 |
| WO | WO 2005/017727 | 2/2005 |

OTHER PUBLICATIONS

Communication from German Patent Office, mailed Jul. 1, 2008.

\* cited by examiner

OPERATING DEVICE OF A MOTOR VEHICLE AND METHOD FOR RECORDING USER INPUTS

CROSS-REFERENCE TO RELATED APPLICATIONS

The present application claims priority to Application No. 10 2006 059 032.5, filed in the Federal Republic of Germany on Dec. 14, 2006, which is expressly incorporated herein in its entirety by reference thereto.

FIELD OF THE INVENTION

The present invention relates to an operating device of a motor vehicle and to a method for recording user inputs in a motor vehicle.

BACKGROUND INFORMATION

As a rule, motor vehicles have a multitude of operating elements by which different functions of the motor vehicle may be activated. For this, modern motor vehicles, as a rule, have a multifunctional operating device which usually includes a display device. This display device is frequently arranged as a touch screen. Operating areas are indicated on the touch screen. The operation of such an operating element designated as virtual is accomplished by touching the touch-sensitive surface of the touch screen using an actuating element. The actuating element will usually be a body part, generally a finger of the user. The touch screen is arranged such that a touching position is able to be recorded. This is set in relationship to a representation area of the virtual operating element. If the touching position matches the position of representation of the virtual operating element, the operation of the virtual operating element is recorded.

In addition, such multifunctional operating devices include operating elements usually arranged as hardware, which are situated around the display device. In the respective operating context, this makes it possible to show the functions assigned to the individual operating elements, arranged as hardware, graphically on the display device, next to the respective operating elements. This makes it easier for the user to find the respective correct operating element that he has to operate to trigger a desired function.

However, it is frequently not sufficiently clear to the user in spite of this, what the consequences are of operating a certain operating element, in the respective current use context. The result is frequent operating errors. These require a subsequent reversal of an operating action that had just been undertaken before. In the case of a menu-oriented input device this means, for instance, that one has to return to the previous menu plane. Operating errors caused by faulty foreseeability of operating consequences, as well as "trial and error"-shaped operating sequences are costly in time, and consequently represent a safety risk for the driver of the vehicle. In addition, they generate frustration and a negative product experience.

It is true particularly in the case of operating elements that cannot be placed directly adjacent to a display area, that a legend, especially a legend to be taken in context, is possible only in an insufficient manner, or not at all. This inadequate legend contributes to the faulty foreseeability of operating consequences, mentioned above, and thus to operating errors, and indirectly to a safety risk.

Multimedia information systems and control systems for motor vehicles are described, for example, in U.S. Pat. Nos. 6,009,355 and 6,330,497, which offer menu-controlled information on various vehicle systems. The menu control is provided such that, when the operator makes a selection of one of several menu options by operating an operating element, the selected menu option is graphically bolded, and in addition, acoustical information is output, which mentions the purpose or content of the selected option, before the user finally selects it. The final selection is made by a renewed operation. The information associated with the menu option thus selected is output both in the form of text and voice. Consequently, a double operation of an operating element is always required in order to acquire information in this system.

A control and management system for a motor vehicle is described in U.S. Pat. No. 6,703,944, which is implemented via a menu-guided graphic user surface. The selection of options is made using a mouse, a trackball, a joystick, or via an operating element provided in hardware or virtually, using a touch screen.

A method and a device of a contact-free acting operating element for a motor vehicle is described in PCT International Published Patent Application No. WO 2004/078536. For this purpose, high frequency signals are coupled into the human body of a user. When the body approaches an operating element that includes a sensor for receiving the high frequency signals, or if such a sensor is arranged in its surroundings, the high frequency signals are able to be recorded before contact is made with the operating element. In this manner, it is possible to record an approach to the respective operating element before the actual touching and operating of the operating element. With the aid of a plurality of sensors, it is additionally possible to ascertain the position of the body part, for instance, of the finger, in three-dimensional space.

SUMMARY

Example embodiments of the present invention provide an operating device for a motor vehicle, as well as a method for recording a user input, using which the intuitive operation of vehicle functions and systems is made easier, and, in addition, the probability of an operating error, particularly one based on a lack of foreseeability of the consequence of the operation of an operating element by the user, is reduced.

To do this, it is provided that an operating device of a motor vehicle, which includes a control unit and at least one operating element coupled to the control unit, via the operation of which a user input is able to be recorded, includes an approach sensor system, that is coupled to the control unit, using which the approach to an operating element, especially by a body part, e.g., a finger of a user, to the at least one operating element before the operation of the at least one operating element is able to be recorded, the control unit being configured to output information that is in connection with an operation of the operating element before the operation of the operating element, in response to the recorded approach of the actuating element to the at least one operating element. A user input is thus recorded using an operation of at least one of the at least one operating element, control signals being generated by a control device, coupled to the at least one operating element, to trigger a function/operating action. The approach of the activating element to the at least one operating element is recorded using an approach sensor system linked to the control unit, and as a result of the recorded approach to the at least one operating element, information in connection with the operation of the operating element is output. Thereby, information is output to the user, which allows him to estimate what consequence is entailed by the operation of the operating element to which he has approached the actuating element. In the following, it is assumed that the actuating element is in each case an index finger of one hand of the user. In practice, however, any other object could just as well be involved which the user puts near the operating element to operate it, for example, a pin, pen or stylus. Using the operating device described and the method described, it may be achieved that the operating consequences are able to be recognized without having to trigger the corresponding operating action. This avoids unnecessary operating actions. In an overall sense, this leads to increased convenience for the user. Moreover, the overall operating time is shortened, which means an increase in safety, since a driver is distracted from other tasks for a shorter period, so that he is able to trigger a vehicle function or perform another operating action. All in all, the probability of an operating error and the number of operating errors is clearly reduced.

The control unit may be coupled to a display unit, and the output of information may take place visually via the display device.

The display device may be a display device arranged as a touch screen. The at least one operating element may be a virtual operating element, arranged using the touch screen. The at least one operating element may also be a switching element provided in hardware. Moreover, this does not necessarily have to be arranged adjacent to a display device.

The output information may include a view of at least a part of the view which will be displayed on the display device after an operation of the at least one operating element. This makes possible a preview of a view that will result on the display area after the operation of the at least one operating element. If the at least one operating element is provided as a virtual operating element on a touch screen, it will be desirable also to show its representation during the preview, faded in or faded out, in order to give the user an orientation as to how he is able to trigger the at least one operating element. The fading in and/or the superimposing may especially be done transparently. In such a case, the preview differs from the actual view after the operation of the at least one operating element in that the at least one operating element, in the view after the operation, is not shown at another place or graphically bolded. Because at least a part of the view that results, after the operation of the at least one operating element, is shown as a preview, the user is still given sufficient information to inform himself about the operating consequence before operating the at least one operating element.

It may be provided, in addition and/or alternatively, that the output information includes an explanation of the function/operating action triggered in response to the operation of the at least one operating element. Thus, for example, in response to the approach to the at least one operating element, a text may be faded in on the display device which describes and/or characterizes the function and/or operating action triggered by the operation.

It may be provided that at least one further operating element is coupled to the control unit, the approach sensor system being configured such that an approach of the actuating element to the at least one operating element is able to be distinguished from an approach to the at least one further operating element. The control unit is configured so that when it detects an approach of the actuating element to the at least one further operating element, it outputs information in connection with the operation of the at least one further operating element. This means that the user is able to approach the actuating element, e.g., his finger, to different operating elements and in each case he has output to him the information, in connection with the operation of the respective operating element, which is linked to that operating element to which the actuating element is currently closest.

It may be provided that the information in connection with the at least one operating element or the at least one further operating element is output acoustically and/or visually. An acoustical output provides that a user does not have to avert his view from the roadway, to check the operating consequence of an operating element. Especially in the case of operating elements that are not located closely adjacent to the display device, this is additionally advantageous since, as a rule, the user has directed his view to the operating element to which he is approaching the actuating element. Consequently, he is not forced by the acoustical information output to look at a display that is not located within his field of view, while he is observing the operating element.

In order to provide speedy operation via the operating device, it may be provided that the output of information before the operation of the operating element takes place only when the approach of the actuating element to the at least one operating element and/or to the at least one further operating element lasts for a time span that is greater than a specified time interval. Consequently, if the user does not want any information which makes a preview and an estimation of the operating consequence possible, he is able to approach the actuating element to the operating element in a speedy motion, and to actuate it, without having information in connection with the operation output before the operation of the operating element.

The features of the method according to example embodiments of the present invention have the same or similar advantages as the corresponding features of the device.

Example embodiments of the present invention are described in more detail below with reference to the appended Figures.

DETAILED DESCRIPTION

Figure 1:
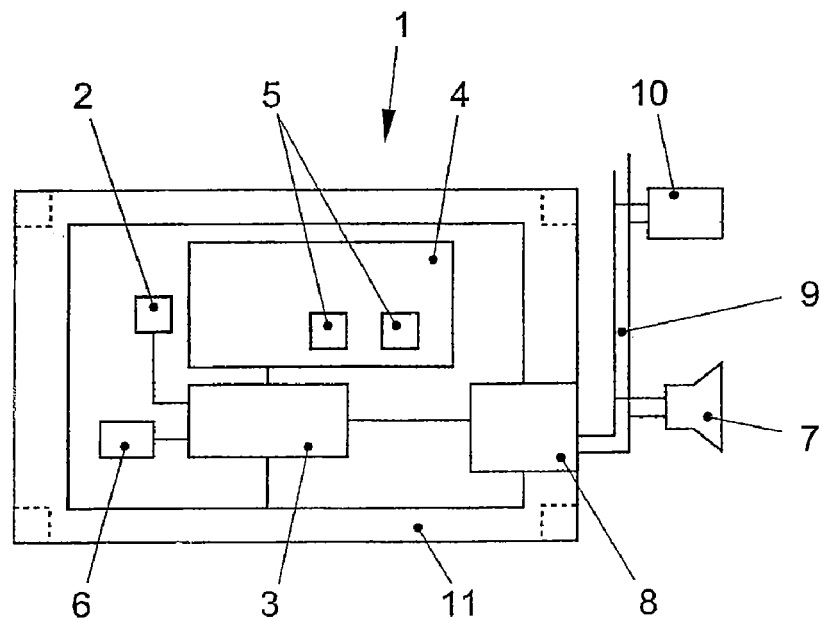
FIG. 1 schematically illustrates an operating device.

FIG. 1 schematically illustrates an operating device 1. The operating device includes an operating element 2 arranged as a switching element which is coupled to a control unit 3. A display device 4 is coupled to the control unit 3.

The display device 4 is arranged as a touch screen. Further operating elements 5, that are virtual operating elements, are arranged with the assistance of display device 4. A memory device 6 is also coupled to control unit 3. In memory unit 6, information is stored which is output in response to the approach of an actuating element to operating element 2 or one of further operating elements 5, before an operation of operating element 2 or one of further operating elements 5. In each case, that information is output which is in connection with the operation of operating element 2, or one of further operating elements 5. The output takes place either via display device 4 or via an acoustical output device 7, which is coupled to operating device 1. The coupling may take place via an interface 8 and a vehicle data bus 9. Control unit 3 is able to receive additional information in connection with an operation of operating element 2, or one of further operating elements 5, and store it in memory unit 6, via vehicle data bus 9 and interface 8. If operating device 1 is used, for instance, to operate a CD player, the information received may include a CD title as well as the names of songs included on it.

If operating element 2 or one of further operating elements 5 is operated by an actuating element, such as the finger of a user, control device 3 generates signals in order to trigger corresponding vehicle functions. These signals are transmitted via interface 8 and vehicle data bus 9 to the corresponding vehicle systems 10, which execute and/or make available the corresponding functions. Operating device 1 also includes an approach sensor system 11, which may include several sensors and is in a position to record an approach of an actuating element to the one operating element 2 or one of the further operating elements 5. Approach sensor system 11 is configured so that it is able to distinguish an approach of the actuating element to operating element 2 from an approach to one of the further operating elements 5, and vice versa. An approach to the further operating elements 5, respectively, can also be distinguished.

Figure 2:
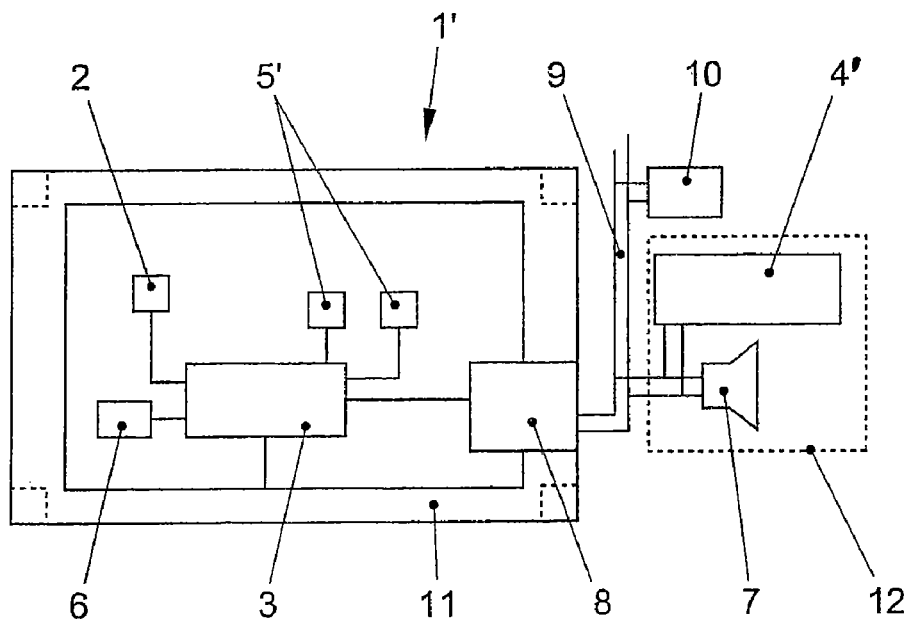
FIG. 2 schematically illustrates an operating device.

FIG. 2 illustrates an operating device 1'. The same features are marked with the same reference numerals. The arrangement illustrated in FIG. 2 differs from that illustrated in FIG. 1 in that operating device 1' does not include a display device. Furthermore, further operating elements 5' are arranged as hardware switching elements. Display device 4' is combined with acoustical output device 7 in a multimedia unit 12, which is connected to operating device 1' via vehicle data bus 9. Other than that, the mode of operation of operating device 1' illustrated in FIG. 2 is analogous to operating device 1 illustrated in FIG. 1.

Other arrangements may be provided so that they only include one operating element.

The approach sensor system may be configured so that it records high frequency signals transmitted over the body, as described above. Alternatively, other sensors and sensor arrangements may be used for the implementation of approach sensor system 11. Optical methods may be used, for instance.

A sensor unit of an optical approach sensor system may be arranged, for example, according to the following principle. A transmitting LED radiates a rectangular amplitude-modulated light signal in the optical or infrared wavelength range. The light signal reflected at the actuating element is recorded by a photodiode. An also rectangular shaped amplitude-modulated reference signal, that is phase-shifted by 180°, is sent by a compensation LED to the photodiode via a constant light path. The compensation LED is compensated via a control loop using a control signal such that the received reflected light signal of the send LED and the received reference light signal of the compensation LED cancel out at the photodiode, and an equisignal is detected. A change in the control signal is a measure of the distance of the object. A sensor unit arranged according to this principle is largely independent of temperature fluctuations and brightness fluctuations. An approach sensor system, which is able to ascertain the position of the actuating element in space, may include several such sensor units.

Figure 3A:
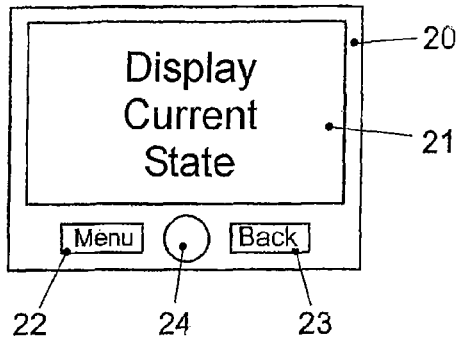
FIG. 3a illustrates an operating device before an actuating element has approached.

FIG. 3a schematically illustrates an operating device 20. Operating device 20 includes a display device 21. An operating element 22 and a further operating element 23 are arranged below display device 21, which are each provided as push-button switches. Between operating element 22 and further operating element 23 there is an additional operating element 24, which is provided as a lockdown button. On display device 22, there is shown a view of a current state of the operated vehicle system or the function to be operated or the user surface, etc.

Figure 3B:
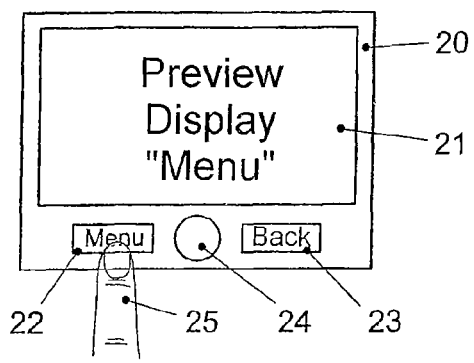
FIGS. 3b and 3c schematically illustrate the operating devices illustrated in FIG. 3a, in which an actuating element has approached an operating element or a further operating element.
Figure 3C:
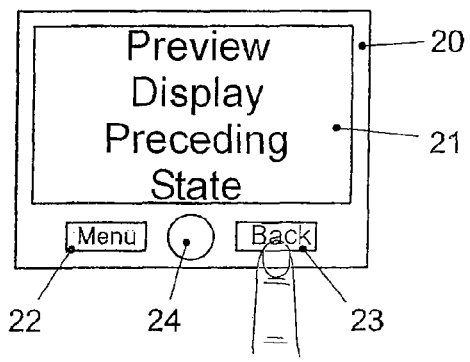

FIG. 3b illustrates operating device 20 according to FIG. 3a. An actuating element 25, which is a finger of the user, has approached operating element 22, but has not yet operated it. This condition is indicated in that actuating element 25 is shown half-transparently. On display device 21 there is shown a display of a menu which is called up in response to an operation of operating element 22. Correspondingly, in FIG. 3b, operating device 20 according to FIG. 3a is illustrated, actuating element 25 being moved via further operating element 23. Correspondingly, the information linked to the operation of further operating element 23, that is provided as a back button, is shown. Consequently, this is the view that is shown in a preceding operating plane.

Figure 3D:
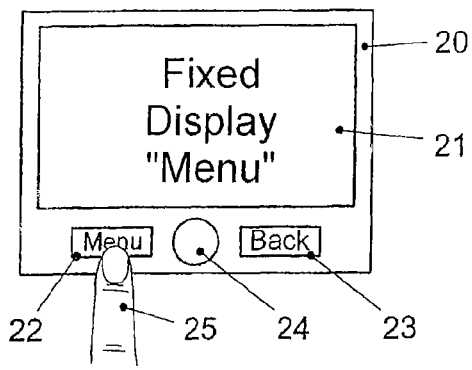
FIGS. 3d and 3e schematically illustrate the operating device illustrated in FIG. 3a, which come about after the actuating element has operated the operating element or the further operating element.

In FIG. 3d, operating device 20 is illustrated in the state that results when actuating element 25 has operated operating element 22. On display device 21, that menu is shown which was shown as a preview before. The difference is that the menu continues to be shown when actuating element 25 is removed.

Figure 3E:
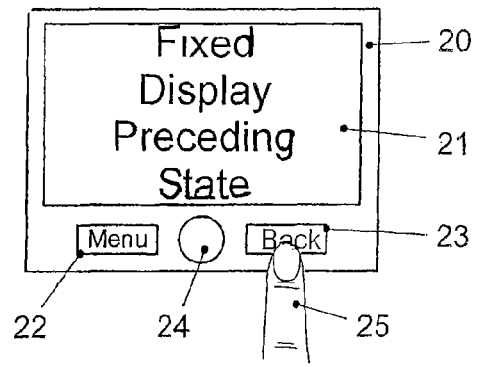

Correspondingly, in FIG. 3e, the state of operating device 20 is illustrated which results when further operating element 23, that is arranged as a back button, has been operated by actuating element 25. That state is shown in a fixed manner which corresponds to the preceding operating plane.

Figure 4A:
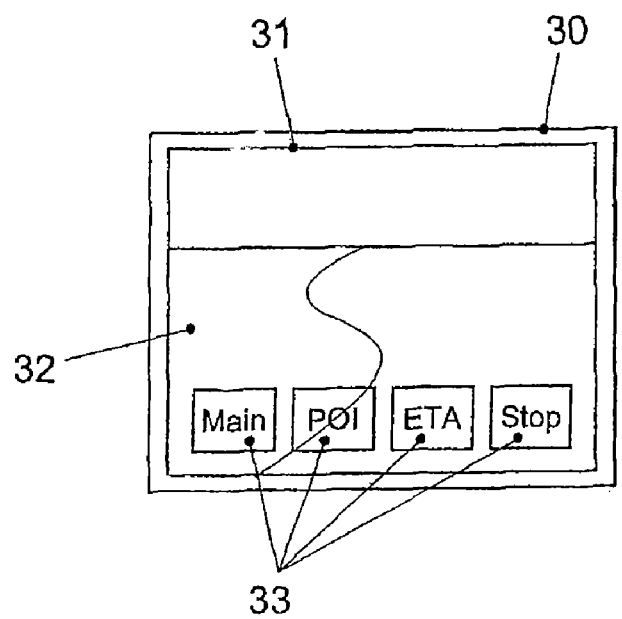
FIG. 4a schematically illustrates an operating device arranged as a touch screen before an operating action.
Figure 4B:
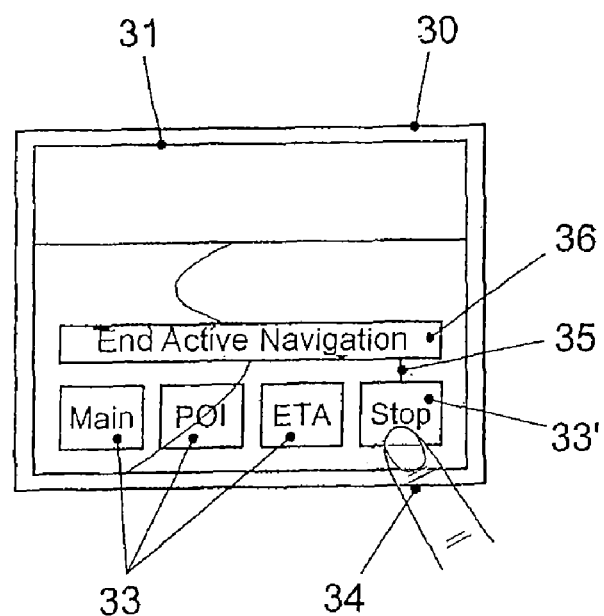
FIG. 4b is a schematic view of the operating device illustrated in FIG. 4a, in a state in which an actuating element has approached one of the operating elements.

FIGS. 4a and 4b illustrate an operating device 30. This includes a display device 31 which is provided as a touch screen. In a lower area of a view 32 of a navigation system application, operating elements 33 are faded in. In FIG. 4a, a state is shown in which no actuating element, that is, no finger, has approached one of operating elements 33. In FIG. 4b, by contrast, an actuating element 34, a finger, has approached an operating element 33' of operating elements 33 that is arranged as a "stop" button. An explanation has been faded in in a box 36 that is connected via a line 35. The explanation states the effect of operating the "stop" button. In this case, an active navigation is terminated. Consequently, the user is able to obtain an operating consequence before he operates a "stop" button. In order to emphasize the explanation even more clearly, operating element 33', that is arranged as a "stop" button, is also optically highlighted in FIG. 4b.

The fading in of the explanation in box 36 may take place only when actuating element 34 lingers above the "stop" button for a period of time that is greater than a specified time interval. Otherwise, the fading in of the explanation does not take place, and this makes possible an operating action that is not "interrupted" by the fading in of an explanation or a preview. Such time-dependent behavior may also be provided in the case of all the other example embodiments described.

Figure 5A:
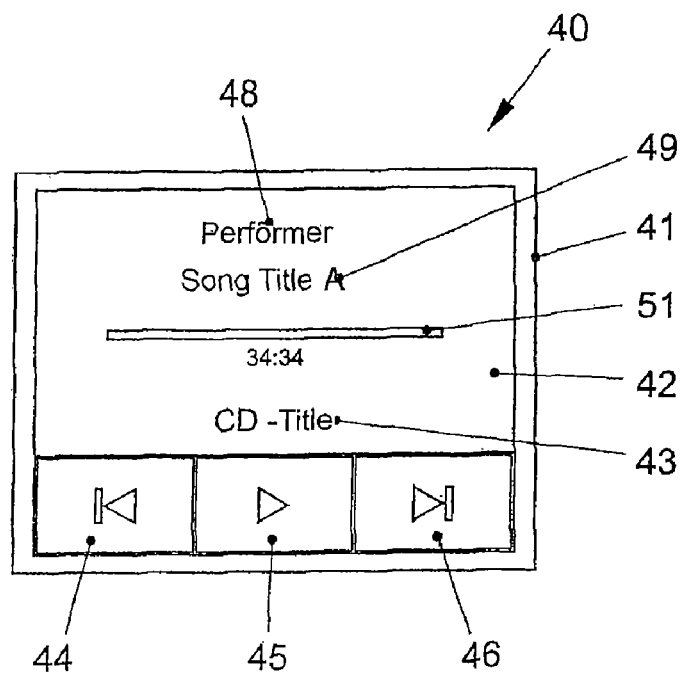
FIG. 5a is a further schematic view of an operating device in which no actuating element has approached one of the operating elements.
Figure 5B:
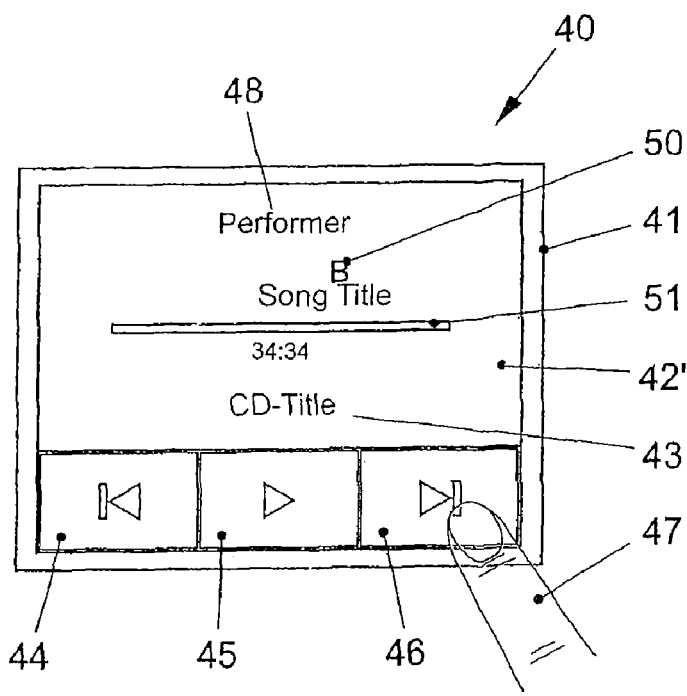
FIG. 5b is a schematic view of the operating device illustrated in FIG. 5a, in a state in which an actuating element has approached one of the operating elements.

An operating device 40, such as that illustrated in FIGS. 5a and 5b, includes a display device 41 that is arranged as a touch screen. A view 42 of a user interface is shown on display device 41, by which a CD playback device may be controlled.

The view shows the title of inserted CD 43, the name of the artist(s) (performer) 48 and in each case a song title 49, 50 that is currently being performed, as well as total playing time 51. FIG. 5*a* shows the view in which no actuating element has approached one of operating elements 44, 45, 46. Operating element 44 is arranged as a skip backward button, operating element 45 is arranged as a play button and operating element 46 is arranged a skip forward button.

As illustrated in FIG. 5*b*, an actuating element 47, which is a finger, has approached operating element 46. Accordingly, operating element 46 is optically highlighted in the view. The remaining view 42' differs from view 42 illustrated in FIG. 5*a* in that, instead of song title A 49, the next song title B 50 has been faded in. The next song title B 50 may be shown highlighted. The view is thus shown which results when actuating element 47 operates operating element 46. It is made possible thereby that the user lets the next song title B 50 be indicated to him, without interrupting current song title A 49, which would be the effect of operating the skip forward button.

The exemplary embodiments described make clear that an intuitive operation becomes possible for the user. Because of the ability to give a preview and the output of explanations, which state the operating consequence for an operating element, it is possible to inform oneself on these operating consequences, before engaging in an operation. Operating errors may thereby be avoided. In addition to the visual preview and/or explanations, which may be combined, or alternatively, an acoustical output may also take place in each case.

List of Reference Character
1, 1' operating device
2 operating element
3 control unit
4, 4' display device
5, 5' further operating elements
6 memory unit
7 acoustical output device
8 interface
9 vehicle data bus
10 vehicle system
11 approach sensor system
12 multimedia system
20 operating device
21 display device
22 operating element
23 further operating element
24 additional operating element
25 actuating element
30 operating device
31 display device
32 view
33 operating element
34 actuating element
35 line
36 box
40 operating device
41 display device
42, 42' view of the display device
43 CD title
44 operating element
45 operating element
46 operating element
47 actuating element
48 performer
49 song title
50 next song title
51 total playing time

What is claimed is:

1. An operating device of a motor vehicle, comprising:
 a control unit;
 at least one operating element coupled to the control unit and configured to record a user input; and
 an approach sensor system coupled to the control unit and configured to record an approach of an actuating element to the operating element before operation of the operating element;
 wherein the control unit is configured to output information to a user, in response to a recorded approach of the actuating element to the operating element, in connection with an operation of the operating element before operation of the operating element occurs.

2. The operating device according to claim 1, wherein the actuating element includes at least one of (a) a body part and (b) a finger of a user.

3. The operating device according to claim 1, further comprising a display device coupled to the control device.

4. The operating device according to claim 3, wherein the display device includes a touch screen.

5. The operating device according to claim 1, wherein the operating element includes at least one of (a) a virtual operating element arranged on a touch screen and (b) a switching element provided in hardware.

6. The operating device according to claim 1, wherein the control unit is configured to output of the information in connection with the operation of the operating element only if the recorded approach of the actuating element to the operating element lasts for a time period that is greater than a specified time interval.

7. The operating device according to claim 1, wherein the output information includes a view of at least one part of a view of a display device displayable on the display device after an operation.

8. The operating device according to claim 1, wherein the output information includes an explanation of at least one of (a) a function and (b) an operating action triggered in response to the operation of the operating element.

9. The operating device according to claim 1, further comprising at least one further operating element coupled to the control unit, the approach sensor system configured to differentiate between an approach of the actuating element to the operating element and an approach to the further operating element, the control unit configured to output information, when the control unit detects an approach of the actuating element to the further operating element, in connection with operation of the further operating element.

10. The operating device according to claim 1, wherein the information includes an indication of a consequence of the operation of the operating element.

11. A method for recording user inputs in a motor vehicle, comprising:
 recording an operation of at least one operating element and generating control signals by a control unit coupled to the operating element for triggering at least one of (a) a function and (b) an operating action;
 recording an approach of an actuating element to the operating element before an operation of the operating element occurs using an approach sensor system linked to the control unit; and
 outputting, to a user, as a result of the recorded approach to the operating element, information in connection with an operation of the operating element before an operation of the operating element occurs.

12. The method according to claim 11, wherein the actuating element includes at least one of (a) a body part and (b) a finger of a user.

13. The method according to claim 11, wherein the information is output in the outputting step via a display device coupled to the control unit.

14. The method according to claim 11, wherein the operating element includes a virtual operating element provide on a display device including a touch screen, the recording of an operation of the operating element including ascertaining a touching position of the actuating element on a surface of the display device.

15. The method according to claim 11, wherein the outputting includes outputting as output information a view of at least one part of a display surface of a display device that will be displayed on the display device after an operation.

16. The method according to claim 11, further comprising outputting an explanation of at least one of (a) the function and (b) the operating action that is triggered in response to the operation of the operating element.

17. The method according to claim 11, wherein at least one further operating element is coupled to the control unit, the method further comprising:

differentiating, by the approach sensor system, between an approach of the actuating element to the operating element and an approach to the further operating element; and outputting information, upon detection of an approach of the actuating element to the further operating element, in connection with operation of the further operating element.

18. The method according to claim 11, wherein the outputting includes outputting information in connection with the operating element at least one of (a) acoustically and (b) visually.

19. The method according to claim 11, wherein the outputting of the information before the operation of the operating element is performed only if the approach of the actuating element to the operating element lasts for a time span that is greater than a specified time interval.

20. The method according to claim 11, wherein the information includes an indication of a consequence of the operation of the operating element.

* * * * *